United States Patent [19]

Ringuette

[11] Patent Number: 4,669,215
[45] Date of Patent: Jun. 2, 1987

[54] FISH-HOOK ASSEMBLY

[76] Inventor: Jacques Ringuette, 8013 Talbot Boulevard, Chicoutimi, Quebec, Canada, G7H 4B3

[21] Appl. No.: 824,592

[22] Filed: Jan. 31, 1986

[51] Int. Cl.$^4$ ............................................. A01K 83/00
[52] U.S. Cl. ........................................................ 43/34
[58] Field of Search .......................... 43/34, 35, 37, 89

[56] References Cited

U.S. PATENT DOCUMENTS

| 4,670 | 7/1846 | Engelbrecht | 43/34 |
| 5,256 | 8/1847 | Johnson | 43/34 |
| 839,611 | 12/1906 | Martin | 43/34 |
| 2,619,759 | 12/1952 | Penninger . | |

FOREIGN PATENT DOCUMENTS

| 89000 | 2/1904 | Canada . |
| 106307 | 3/1907 | Canada . |

Primary Examiner—Gene P. Crosby

[57] ABSTRACT

The fish-hook assembly comprises an elongated frame bar to be secured at its rear end to a fishing line. A trigger arm is pivoted at its center to an intermediate section of the bar and is biased by a first tension spring in counterclockwise rotation. A first upwardly-curved hook is pivotally secured to the bottom end of the trigger arm and extends forwardly and is slidably mounted in the front end portion of the frame bar. A second hook is pivotally mounted at the front portion of the frame bar for pivotal action about a plane parallel to that defined by the first hook. A second tension spring biases the second hook in counterclockwise rotation, that is forwardly when rearwardly positioned in set position where it is upwardly curved. The top end of the trigger arm defines a transverse tab engageable in a longitudinal slit made in the second hook for retaining the latter in its set position. When a fish bites a bait secured to the first hook and pulls the latter against the bias of the first spring, the first hook slides forwardly, bringing the trigger arm in clockwise rotation. The arm tab thus disengages from the second hook slit, and the second hook yields to the bias of the second coil spring and pivots forwardly counterclockwise to impale the head of the fish.

1 Claim, 4 Drawing Figures

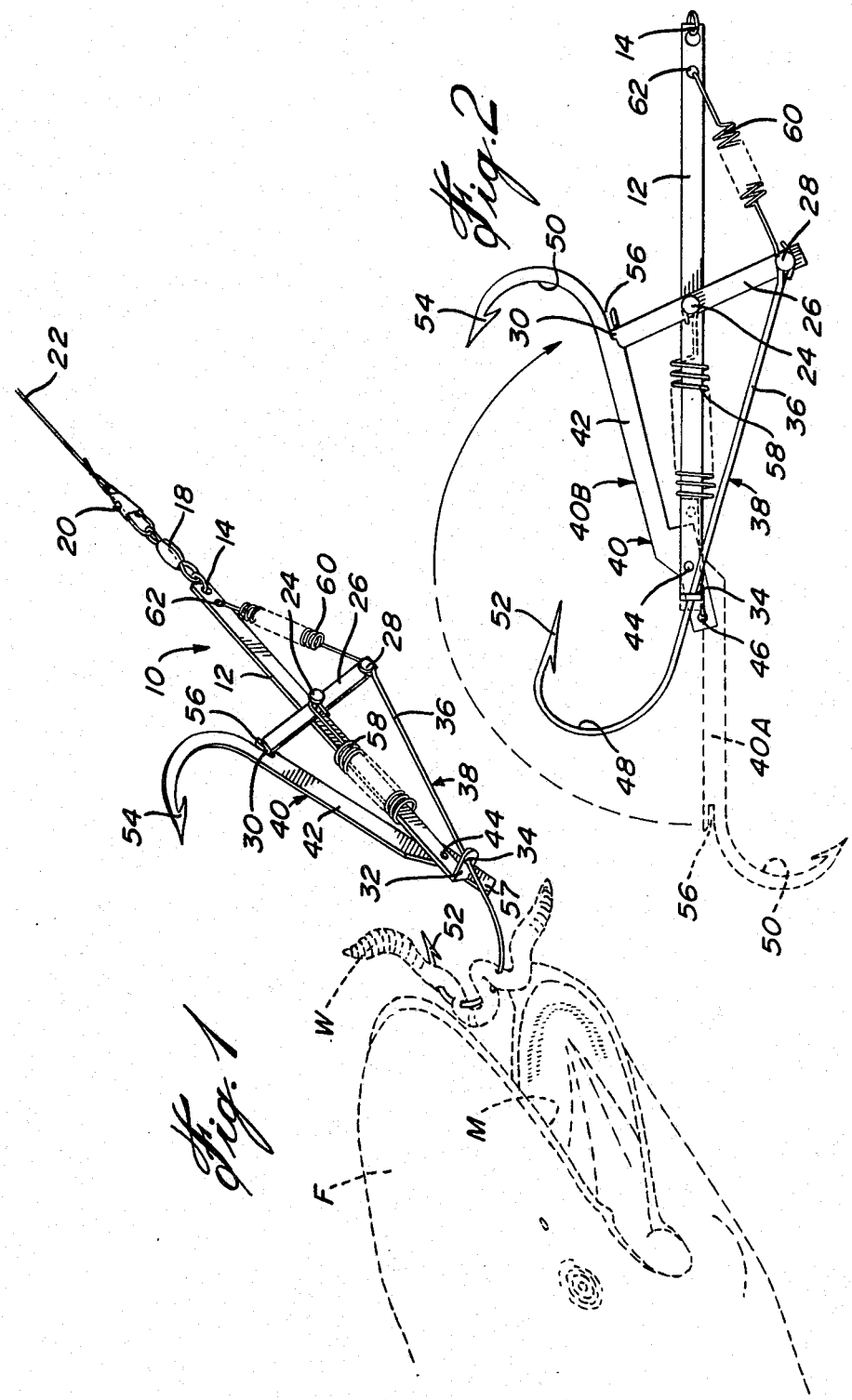

U.S. Patent  Jun. 2, 1987  Sheet 2 of 2  4,669,215
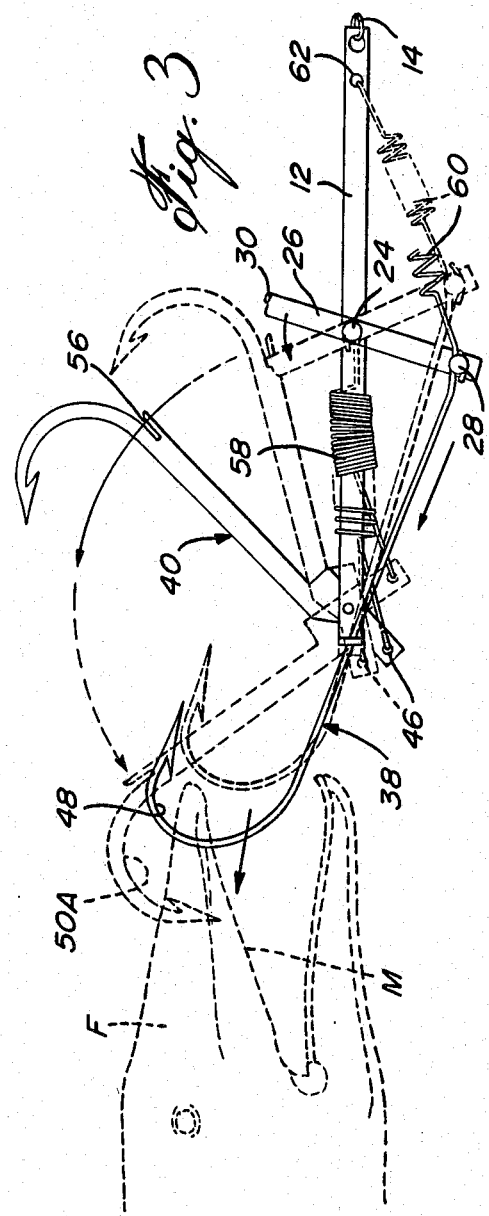
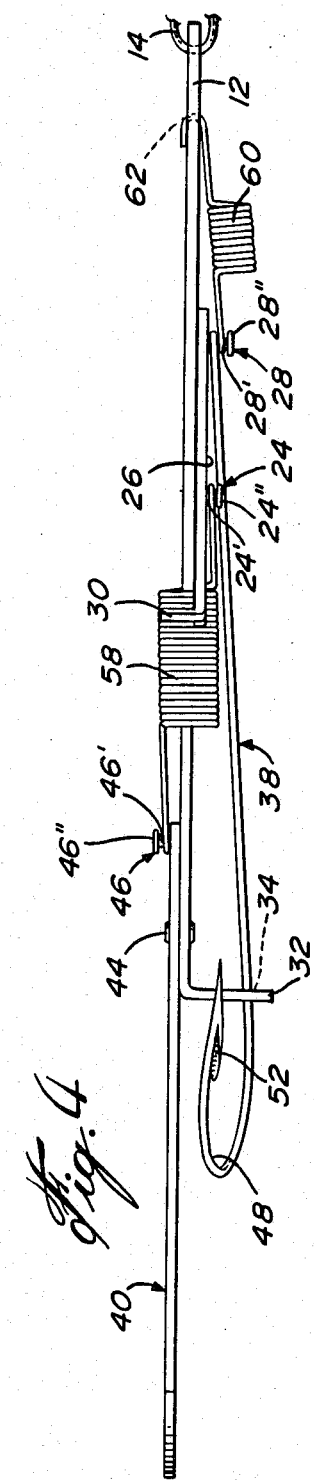

FISH-HOOK ASSEMBLY

BACKGROUND OF THE INVENTION

This invention relates to the art of fishing tackle.

Loosing a game fish after a long struggle therewith because of inadequate securement of the fish-hook thereto, is most frustrating. One means to obviate such a problem has been to add a second hook to the main bait-carrying hook of the fish-hook assembly, which would be triggered to impale the fish when the main hook is grabbed by a tempted fish. See, for example, Canadian Pat. Nos. 89,800—106,307—264,127 and U.S. Pat No. 2,619,759.

The most pertinent is Canadian Pat No. 89,000, issued in August 1904 to Anderson, which shows a fish-hook having a main hook 8. Spur 17 will pivot from its position of FIG. 3 to its position of FIG. 1 when the hook 8 is pulled downwardly, when looking at the drawings. This device is complex and massive in that it requires a large plate-like body 1 for carrying two right-angle spring means, at 14, for hook 8, and at 20 for spur 17, to actuate spur 17.

OBJECTS OF THE INVENTION

An important object of the invention is therefore to provide a most simple fish-hook assembly of the type including main hook and a second impaling hook for firmly securing a game fish thereby caught.

A further object of this invention is to provide such a fish-hook assembly characterized by a very low threshold of triggering of the second impaling hook upon the fish pulling the main hook.

SUMMARY OF THE INVENTION

There is disclosed a fish-hook assembly comprising an elongated frame bar adapted to be secured to a fishing line at its rear end. A trigger arm is pivotally mounted at an intermediate portion thereof to said frame bar for relative movement thereabout. A main hook has a shank which is slidably carried by the front end of said frame bar and which is pivotally connected to a first end of said trigger arm. An impaling hook is pivoted to the front end of said frame bar for pivotal action in a plane parallel to that defined by said main hook. Biasing means biases said impaling hook for pivotal movement towards said main hook. Interengageable catch means are formed at the second end of said trigger arm and on said impaling hook to releasably retain the latter in a cocked position spacedly from said main hook against the bias of said biasing means. The catch means is sensitive to the pivotal movement of said trigger arm. A pull exerted by a fish on the main hook produces pivoting of the trigger arm, which releases the impaling hook which in turn pivots to an uncocked fish-impaling position. Preferably, a second weaker biasing means biases the trigger arm to a catch position retaining the impaling hook in cocked position.

BRIEF DESCRIPTION OF THE DRAWINGS

FIG. 1 is a front downwardly-looking perspective view of a fish-hook assembly, in cocked position accordingly with the invention, said hook assembly being secured to the end of a fishing line, and also showing in dotted lines a worm bait and the open mouth of a tempted fish;

FIG. 2 is a side elevation of said assembly in cocked position, shown in uncocked position in dotted lines;

FIG. 3 is a slightly enlarged side elevation of said hook assembly and in dotted lines the fish, showing the dynamics of said hook assembly when the fish bites at the bait, from its cocked position to its uncocked position; and FIG. 4 is a top plan view of said hook assembly in uncocked position.

DETAILED DESCRIPTION OF THE PREFERRED EMBODIMENT OF THE INVENTION

The fish-hook assembly of the invention, denoted 10, comprises a rigid, elongated metallic frame bar 12 having a rearward line eye 14, which carries a swivel 18 removably attached to a conventional spring hook 20, in turn attached to a fishing line 22.

About an intermediate section of frame 12, there is mounted a rivet 24 pivotally interconnecting the intermediate section of a trigger arm 26 to the bar 12. One end of arm 26 carries a rivet 28. Rivets 24, 28 define a stem 24', 28' and an enlarged head 24" 28", respectively, spaced from arm 26, and on the opposite side of frame bar 12. The other end of trigger arm 26 is bent to form a transverse tab 30 extending toward frame bar 12.

The front end of frame bar 12 defines a transverse leg 32 extending on the side of trigger arm 26. Leg 32 has a guide eye 34 for sliding engagement by the elongated, straight shank 36 of main hook 38. The inner end of hook shank 36 is curved around rivet stem 28' to form a pivotal connection, whereby rotation of arm 26 reciprocates the main hook 38 through guide eye 34.

A rigid metallic, impaling hook 40 is pivotally mounted at an intermediate section of its elongated stem 42 to the front portion of bar 12, short of transverse leg 32 and on the opposite side thereof, by a pivot member 44. A rivet 46 is mounted to the inner end of hook stem 42, on the side opposite of trigger arm 26. Rivet 46 has a stem 46' and a head 46" spaced from hook stem 42.

Hooks 38, 40 define outer curved ends 48, 50, having sharpened barbed ends 52, 54, respectively. Hook 40 further defines a small longitudinal slit 56 at the exterior of the intersection of stem 42, with curved portion 50, for releasable engagement by trigger arm tab 30. Pivot member 44 and rivet 46 are mounted about an end portion 57 of hook stem 42 that is slightly laterally offset relative to the longitudinal axis of stem 42, the offset 57 being on the side opposite that of the curved end portion 50. Hook 40 is much sturdier built than hook 38, but shorter.

A tension coil spring 58 surrounds frame bar 12 and is hooked at its two ends to the rivet stems 24' and 46'.

In the uncocked position shown in dotted lines in FIG. 2, hook 40 being at position 40A, curved portion 50 extends downwardly and forwardly of frame bar 12; stem 42 is substantially parallel to frame bar 12; shank 36 is rearwardly divergent from frame bar 12; and curved portion 48 extends upwardly, forwardly of frame bar 12, but rearwardly of curved portion 50. Pivoting movement of hook 40 towards the rear, to the cocked position 40B of FIG. 2, is made against the bias of spring 58. Hooks 38, 40 are then both rearwardly divergent from frame bar 12, both curved ends 48, 50 extending upwardly and directed towards each other. Upwardly-frontwardly-inclined trigger arm 26 retains hook 40 in cocked position by engagement of its latching tab 30 into slit 56.

Another tension coil spring 60 preferably interconnects rivet stem 28' to a hole 62 made in frame bar 12 near eye 14. Spring 60 has two functions. First, it biases trigger arm tab 30 into slit 56 of the cocked impaling hook 40, so as to prevent undesired release of the trigger arm 26. Also, it provides for the rearward return of main hook 38 when the forward pulling force has ceased.

It is understood that, should a fish F grasp a bait, such as worm W carried by curved end 48 of main hook 38, see FIG. 1, the upper inside wall of its mouth M will be pierced by the hook sharpened barbed end 52. Upon the fish trying to escape, it will apply a forward pulling force on the hook 38, which will slide forwardly through eye 34, against the bias of spring 60. Trigger arm 26 will be drawn by shank 36 to consequently pivot clockwise when seen from the side of FIG. 2, whereby trigger arm tab 30 will slide outwardly from slit 56, thus releasing impaling hook 40.

The distance between pivots 24, 28, and between pivot 24 and tab 30, being about the same, and accordingly with a very low resiliency of spring 60, only a slight pivotal force applied to arm 26 will be necessary to release hook 40. Such a very low threshold of triggering of the spring-loaded hook 40 in cocked position is very useful, especially in the catching of quick-striking fish, such as trout or bass.

When released, main hook 40 rotates about pivot 44 under the bias of spring 58 (see FIG. 3), whereby the hook sharpened barbed end 54 will impale the fish head forwardly of barbed end 52. The fish is therefore trapped between the two hooks 38, 40.

It should be noted that spring 60 acts as a shock absorber, which prevents breakage of fishing line 22 by a sudden fish strike, since the force is not transmitted directly to line 22 but through spring 60.

It is easy to recock the fishing assembly to the position shown in full line in FIG. 2.

What I claim is:

1. A fish-hook assembly comprising an elongated frame bar adapted to be secured to a fishing line at one end and having at its other end a transverse leg provided with an eye, a trigger arm pivotally mounted intermediate its ends about a first pivot to an intermediate portion of said frame bar, said first pivot having a shank with a head spaced from a side of the trigger arm, a main hook having a straight shank slidably inserted in said eye and a barbed hook portion protruding from said leg away from said one end, said shank pivotally connected at its free end to a first end of said trigger arm, an impaling hook pivotally mounted to said frame bar adjacent said leg for pivotal movement in a plane generally parallel to that defined by said main hook, a first tension spring encircling said frame bar and attached about said shank of said first pivot and to said impaling hook and biasing the latter for pivotal movement towards said main hook from a cocked position away from said main hook, a laterally-extending tab formed at the second end of said trigger arm releasably engageable with an open slit formed on the shank of said impaling hook to releasably retain the latter in a cocked position, spaced from said main hook against the bias of said first spring and a second tension spring attached to said first end of said trigger arm and to said frame bar adjacent said one end, the tension force of said first spring being greater than that of said second spring, whereby a pull exerted by a fish on the main hook produces pivoting of the trigger arm relative to said frame bar against the bias of said second spring to disengage said tab from said slit and, thus, release said impaling hook which is free to pivot to an uncocked fish-impaling position under the action of said first spring.

* * * * *